UNITED STATES PATENT OFFICE.

ANGUS S. MACDONALD, OF GREAT NECK STATION, NEW YORK, AND HARRY P. MACDONALD, OF MONTCLAIR, NEW JERSEY, ASSIGNORS TO THE SNEAD & CO. IRON WORKS, OF JERSEY CITY, NEW JERSEY, A CORPORATION OF NEW JERSEY.

METHOD OF DEVELOPING DEFECTS IN METALLIC OBJECTS.

1,327,341.     Specification of Letters Patent.     Patented Jan. 6, 1920.

No Drawing.     Application filed April 13, 1918. Serial No. 228,371.

*To all whom it may concern:*

Be it known that we, ANGUS S. MACDONALD and HARRY P. MACDONALD, both citizens of the United States, residing at Great Neck Station, county of Nassau, and State of New York, and Montclair, county of Essex, and State of New Jersey, respectively, have invented certain new and useful Improvements in Methods of Developing Defects in Metallic Objects, of which the following is a specification.

This invention relates to a simple and expeditious method of determining whether or not metallic objects, such for example as tubes and other members adapted for uses in which they are subject to great stresses, are defective, the method being economical and of such character that the properties of the metal are not injured and, if anything, improved. Certain classes of articles of the foregoing nature are frequently heat treated for tempering, annealing or drawing, and other purposes, and if desired, our improved method may be employed to simultaneously give the desired heat treatment as well as determine and develop flaws or defects in the metal.

We have discovered that by passing an electric current through certain articles, and particularly tubes, in the manner hereinafter indicated, we can readily detect flaws in the metal. We will illustrate our invention by its application to the testing of tubes such as are used for example, in frames subject to stress. Such tubes are usually light; that is to say, the wall of the tube is of relatively thin gage, and since the tube must withstand considerable stresses, it is essential that the section of the wall be substantially uniform throughout and that there should be no flaws or defects in the metal itself, such for example as seams, segregations of the alloy, etc. In so far as flaws in the metal are concerned, they may not be apparent externally, and it is also practically impossible to determine whether or not there are any unduly thin or thick spots in the wall of the tube, in view of which it has heretofore been impossible to positively check the tubes for defects, reliance for quality being placed upon the care exercised in manufacture. It has, of course, been customary in many cases to test a section of the tube in testing machinery to see whether the same has the desired properties and strength and is free from defects, but obviously, the test of a piece of a tube can be no absolute criterion of the remaining portions and must of necessity have general value only. By our improved method, however, we are enabled to positively check or test the entire article, and this in a simple and expeditious manner.

In carrying out our method, as applied to tubes, we place the tube in a pair of suitably supported contacts, one located at each end of the tube and pass an electric current through the tube, preferably of low voltage and high amperage. The contacts are so arranged that the tube, as it is heated by its internal resistance to the passage of the current, may expand. The contacts are also preferably arranged vertically with the tube suspended from the upper contact to prevent warping and other distortion and to put some measure of tension on the tube.

We have found that the heating of the tube by its internal resistance to the passage of an electric current therethrough will develop the flaws or defects to such an extent as to be most clearly perceptible. Thus, for example, if there be a thin spot in the wall of the tube, such portion, because of its relatively greater resistance, will heat up much more rapidly than the remaining portions, and will indicate by the difference in color, due to the difference in temperature, the presence of the defect.

Similarly with the flaws or defects which are in the metal itself, the heating of the article by its internal resistance to the passage of the current will develop such flaws. Thus, for example, seams or segregations of alloy, or other defects producing relatively marked differences in resistance to the passage of the current, will be clearly manifested.

The metal may be heated to any point sufficient to develop the defects and flaws, but we prefer to heat it substantially through the point or period of decalescence, and such being the case, it will be readily understood that our method of detecting flaws can at the same time be used as the medium for heat treating the article. Thus, for example, in one operation, we can heat the tube to a temperature suitable for tempering purposes, which temperature is usually the point of decalescence. When the metal reaches decalescence, the current may be cut off either by discharging the tube from the contacts or by cutting off the current, as may be desired, and then the tube can be quenched in a suitable bath, such, for example, as an oil bath. The heating will make the defects, if any, manifest, and the tube may be rejected before or after quenching, as the case may be. Other heat treating steps may be similarly combined in one operation with the testing.

The advantages and value of our invention in detecting the presence of irregularities, flaws and defects will at once be apparent to those skilled in the art, and it is to be noted in addition that where the article is both tested and heat treated at the same time, uniformity and superiority of product are obtained because the ease of control and other factors incident to heat treatment by electricity render it particularly applicable for such purposes.

By regulating the current we may carry our invention to further refinement. With a given voltage the tube can be heated to a certain corresponding temperature for the reason that the increase in resistance as the metal heats, together with the loss by radiation, brings about a state of equilibrium in which the current passing through the tube does not raise the temperature of the tube. Therefore, we can regulate the current for any desired tolerance of thinness of the tube, and if the tube has a thin spot below the allowable limit, the tube will be burnt in two at such spot. Similarly the current could be regulated for any desired tolerance of thickness, and any portion exceeding the allowable limit would not be heated through the point of decalescence.

The terms "defect," "flaws," "decalescence point" and "heat treatment" as found in this specification are employed in their broad sense.

We claim:

1. The herein described process of developing defective portions in a metallic object without impairing its physical properties which consists in heating the same by its internal resistance to a current of electricity passed therethrough, the heat not being carried substantially beyond the point of decalescence.

2. The herein described process of simultaneously heat treating a tubular metallic object and detecting flaws therein which consists in heating the same to approximately the point of decalescence by its internal resistance to a current of electricity passed therethrough.

3. The herein described process of simultaneously heat treating a metallic object and detecting flaws therein which consists in heating the object to approximately the point of decalescence by its internal resistance to a current of electricity passed therethrough.

In testimony whereof we have hereunto signed our names.

ANGUS S. MACDONALD.
HARRY P. MACDONALD.